United States Patent [19]

Ryan

[11] Patent Number: 5,616,417
[45] Date of Patent: Apr. 1, 1997

[54] LEAD-FREE GLASS FRITS FOR CERAMIC ENAMELS

[75] Inventor: Joseph W. Ryan, Washington, Pa.

[73] Assignee: Cerdec Corporation, Washington, Pa.

[21] Appl. No.: 661,894

[22] Filed: Jun. 12, 1996

Related U.S. Application Data

[62] Division of Ser. No. 447,055, May 22, 1995, Pat. No. 5,559,059.

[51] Int. Cl.$^6$ .............................. B32B 17/06; B32B 9/04; C03C 8/04; C03C 3/066
[52] U.S. Cl. .................. 428/428; 428/427; 428/432; 428/701; 428/699; 501/26; 501/79; 501/14; 501/25
[58] Field of Search .................................. 428/422, 428, 428/432, 701, 702, 699, 697, 704, 913; 501/26, 79, 14, 25, 27

[56] References Cited

U.S. PATENT DOCUMENTS

| | | | |
|---|---|---|---|
| 4,084,976 | 4/1978 | Hinton | 106/48 |
| 4,224,074 | 9/1980 | Reade | 106/48 |
| 4,312,951 | 1/1982 | Eppler | 501/24 |
| 4,340,645 | 7/1982 | O'Conor | 428/428 |
| 4,359,536 | 11/1982 | Graff et al. | 501/25 |
| 4,361,654 | 11/1982 | Ohmura | 501/21 |
| 4,376,169 | 3/1983 | Eppler | 501/24 |
| 4,446,241 | 5/1984 | Francei | 501/14 |
| 4,537,862 | 8/1985 | Francei et al. | 501/14 |
| 4,554,258 | 11/1985 | Francei | 501/21 |
| 4,590,171 | 5/1986 | Nigrin | 501/25 |
| 4,892,847 | 1/1990 | Reinherz | 501/14 |
| 4,970,178 | 11/1990 | Klimas et al. | 501/27 |
| 5,252,521 | 10/1993 | Roberts | 501/17 |
| 5,304,516 | 4/1994 | Clifford | 501/21 |
| 5,306,674 | 4/1994 | Ruderer et al. | 501/70 |
| 5,308,803 | 5/1994 | Clifford et al. | 501/17 |
| 5,342,810 | 8/1994 | Merigaud et al. | 501/26 |
| 5,447,891 | 9/1995 | Spinosa et al. | 501/16 |

FOREIGN PATENT DOCUMENTS

| | | |
|---|---|---|
| 267154 | 5/1988 | European Pat. Off. . |
| 627067 | 9/1927 | France . |

*Primary Examiner*—Mark L. Bell
*Assistant Examiner*—Louis M. Troilo
*Attorney, Agent, or Firm*—Wenderoth, Lind & Ponack

[57] ABSTRACT

Lead-free glass frits having the following composition in weight percent:

| | |
|---|---|
| ZnO | 25–35 |
| $SiO_2$ | 10–17 |
| $ZrO_2$ | 0–2 |
| $Al_2O_3$ | 0–4 |
| $Na_2O$ | 8–12 |
| $B_2O_3$ | 20–30 |
| $Bi_2O_3$ | 6–25 |
| $F^{-1}$ | 1–5 | are useful in the formulation of ceramic enamel compositions.

6 Claims, No Drawings

LEAD-FREE GLASS FRITS FOR CERAMIC ENAMELS

This application is a division of application Ser. No. 08/447,055, filed May 22, 1995, now U.S. Pat. No. 5,559,059.

The present invention provides lead-free glass frits for use in ceramic enamels.

BACKGROUND OF THE INVENTION

Glass frits used in ceramic enamels are typically low melting glasses. The compositions of the frits for ceramic enamels commonly contain a high percentage of lead oxide, and are lead borosilicate glasses. The lead oxide in the composition is primarily responsible for the low melting point of the frit. Cadmium oxide is also present in a number of ceramic enamels, and is present to provide color stability to enamels containing cadmium pigments. Due to concerns about the toxicity of lead and cadmium oxides, it is desirable to develop frits that do not contain either ingredient.

In addition to having a low melting range (required to avoid deformation of the substrate that the enamels is applied to), frits used in ceramic enamels need to meet other requirements. One of the additional criteria that has to be met is that the thermal expansion of the frit closely matches that of the substrate it is applied to. This is necessary to avoid crazing of the enamel and strength reduction of the substrate.

Another condition that has to be met is that the frit has some degree of chemical durability. This requirement can vary depending on the use of the frit, and includes durability to both acidic and alkaline media. With frit development there is usually a compromise involved with the final properties of the frit. In general frits that have low melting ranges have average chemical durability and relatively high thermal expansions, while frits with high melting ranges have above average/excellent durability and relatively low thermal expansions.

A number of lead free frit compositions have been disclosed.

By way of illustration, U.S. Pat. No. 4,554,258 discloses frits which require the presence of $Bi_2O_3$, $B_2O_3$, $SiO_2$ and alkali metal oxides where the bismuth oxide is necessarily present in large concentrations; U.S. Pat. No. 4,376,169 discloses frits which require the presence of alkali oxide, $B_2O_3$, $Al_2O_3$, $SiO_2$, F, $P_2O_5$, ZnO and $TiO_2$ and which have critical compositional limits; U.S. Pat. No. 4,446,241 discloses frits which require the presence of $Li_2O$, $B_2O_3$ and $SiO_2$ among other oxides; U.S. Pat. No. 4,537,862 discloses frits which require the presence of $B_2O_3$, $SiO_2$, $ZrO_2$ and rare earth oxides with the weight ratio of $ZrO_2$ to rare earth oxides being critical; and U.S. Pat. No. 4,590,171 discloses frits which require the presence of $Li_2O$, $Na_2O$, BaO, $Ba_2O_3$, $Al_2O_3$, $SiO_2$, $ZrO_2$ and F. Reference is also made to U.S. Pat. No. 4,084,976, U.S. Pat. No. 4,224,074, U.S. Pat. No. 4,312,951, U.S. Pat. No. 4,340,645 and U.S. Pat. No. 4,361,654 as additional patents in this general area.

U.S. Pat. No. 5,342,810 discusses zinc-containing lead- and cadmium-free glass frits and their use in forming lead-free enamels that can be stored at below 630° C. Obligatory components in mole percent are 31–50 ZnO, 10–44 $SiO_2$, 11–35 $B_2O_3$ and 11–25 $Na_2O$.

U.S. Pat. No. 5,306,674 discusses glass frits that can be fired at temperatures of from about 1100° F. to about 1300° F. The frits have the following composition range in weight percent: 20–40 ZnO, 20–32 $B_2O_3$, 10–30 $SiO_2$ and 4–12 $Na_2O$.

Lead free glass frits characterized by low silica content are described in U.S. Pat. No. 5,252,521. The composition range in weight percent includes 35–77 $Bi_2O_3$, 10–30 $B_2O_3$ and 10–32 ZnO.

U.S. Pat. No. 4,892,847 discloses bismuth based borosilicicates with the following composition range in weight percent: 25–35 $SiO_2$, 25–45 $Bi_2O_3$, 10–25 $B_2O_3$, 4–19 $R_2O$ and 0.3–8 $ZrO_2/TiO_2$.

U.S. Pat. No. 5,308,803 discloses glass frits with the following composition range in mole percent: 35–75 $SiO_2$, 0.1–15 $Bi_2O_3$, 0.1–10 $Al_2O_3$, 1–30 $B_2O_3$ and 5–30 $R_2O$.

Additionally, U.S. Pat. No. 4,970,178 discloses lead-free glass frits with good chemical acid resistance having the following composition range in mole percent: 5–14 $Na_2O$, 8–25 ZnO, 6–13 $B_2O_3$, 45–60 $SiO_2$ and 0–10 $Bi_2O_3$.

It is seen, therefore, that the formulations for the glass frits have varied the nature and concentrations of the oxide components in an attempt to provide acceptable frit formulations. While such frits are alleged to exhibit a variety of desirable properties, they still exhibit deficiencies in one or more performance areas.

DESCRIPTION OF THE INVENTION

Accordingly, it is the primary object of the invention to provide lead free glass compositions which exhibit a broad range of improved performance characteristics.

It has been surprisingly determined that the aforementioned objectives are met by lead free glass compositions that contain ZnO, $SiO_2$, $Na_2O$, $B_2O_3$ and $F^{-1}$ in the appropriate amounts. The frits described in the invention have acceptable chemical durability and thermal expansion. Of particular significance is that the frits have exceptionally low melting ranges. As a result, the frits can be used in a wide range of firing conditions and yield mature enamels. They can also be applied by a wide variety of printing methods.

The glass frits of the present invention consist essentially of the following composition:

| Component | Weight Percent Range |
|---|---|
| ZnO | 25–35 |
| $SiO_2$ | 10–17 |
| $ZrO_2$ | 0–2 |
| $Al_2O_3$ | 0–4 |
| $Na_2O$ | 8–12 |
| $B_2O_3$ | 20–30 |
| $Bi_2O_3$ | 6–25 |
| $F^{-1}$ | 1–5 |

The frits are produced by mixing together the oxide producing materials which are well known in the art. Thus, a batch of oxide, nitrate and fluoride powders can be thoroughly blended and charged into a glass melting furnace at a temperature of about 2100° F. (1150° C.) to form a molten liquid. The molten liquid is then rapidly cooled (quenched) by pouring it into water. Upon quenching small chunks of glass a few millimeters in diameter are formed. The glass is then ground to a fine powder by conventional milling techniques.

The frits of the invention may be used to form improved glass enamel compositions. These glass enamel compositions contain, as essential components, the glass frit and vehicle with the optional presence of a pigment such as a metal oxide pigment.

The vehicle to be employed is selected on the basis of the end use application. It is essential that the vehicle adequately suspend the particulates and burn off completely upon firing of the composition. Vehicles are typically organic and include compositions based on pine oils, vegetable oils, mineral oils, low molecular weight petroleum fractions, tridecyl alcohol and the like. The vehicles may be modified by viscous resins such as vinyl resins, solvents, film formers such as cellulosic materials, and the like.

The optional metal oxide pigments are well known to those skilled in the art. Applicable oxides include, for example, chrome, cobalt, iron, nickel, copper, manganese, and the like. Although the latter metal oxides form preferred black spinel pigments, other metal oxides to produce different pigments and other colors are likewise contemplated. The pigment component will generally comprise from 10 to 40% by weight, of the indicated glass frit.

Methods for applying the enamel coatings are well known to those skilled in the art. The dispersed compositions may be applied by techniques such as screen printing, decal application, spraying, brushing, roller coating, and the like. Screen printing is preferred for purposes of applying the composition to glass substrates.

Glass enamel paint compositions are also formulated with silver metal in order to provide conductive coatings for use, for example, as defrost circuits for automotive backlites and windshield. In such areas of utility, color maintenance, bond strength, solderability, absence of silver migration and abrasion resistance are required performance characteristics. It is to be noted that the compositions containing the inventive frits are applicable for use in conjunction with such conductive coatings for the above noted areas of utility. When the conductive coatings are applied in overlapping relationship with the enamels containing the inventive frits, performance improvements as observed after heat treatment include good resistance to silver migration into the enamel, substantial reduction of undesirable blue haze of the buss bar (bar connecting ends of individual horizontal conductive elements of defrost circuit) and permanence of solder connections.

The following further illustrates various embodiments of the invention. In these embodiments, known techniques are utilized to mix the appropriate raw batch glass compositions, to melt them at generally about 1150° C. for about 45 minutes and then to frit the compositions.

Testing is conducted by adding 4.0 grams of the glass frit to 1.5 cc of a pine oil-based medium and screen printing the resulting dispersion onto glass slides at a wet thickness of 2 mils. The slides are fired at several temperatures to determine the "firing temperature". The firing temperature is the temperature where the glass has sufficient time to flow within a 15 minute fire and yield a glossy, smooth surface.

The acid resistance was evaluated by utilizing ASTM C724-91 using a ten weight percent solution of citric acid. Fired trials are exposed to the 10% citric acid solution for 15 minutes at room temperature and they are graded according to the following scale:

Grade 1—No attack apparent

Grade 2—Appearance of iridescence or visible stain on the exposed surface when viewed at a 45° angle but not apparent at angles less than 30°

Grade 3—A definite stain which does not blur reflected images and is visible at angles less than 30°

Grade 4—Definite stain with a gross color change or strongly iridescent surface visible at angles less than 30° and which may blur reflected images Grade 5—Surface dull or matte with chalking possible Grade 6—Significant removal of enamel with pinholing evident Grade 7—Complete removal of enamel in exposed area The thermal expansion of the frits was measured from 25° C. to 325° C. and has units of $10^{-7}$°$C^{-1}$.

Typical frit formulations of this invention and their attendant performance characteristics are noted in the following table:

| FORMULATION (WEIGHT %) | | | |
| --- | --- | --- | --- |
| Component | 1 | 2 | 3 |
| ZnO | 33.9 | 31.6 | 29.6 |
| $SiO_2$ | 14.9 | 13.9 | 13.0 |
| $ZrO_2$ | 0.9 | 0.9 | 0.8 |
| $Al_2O_3$ | 3.3 | 3.0 | 2.8 |
| $Na_2O$ | 11.1 | 10.3 | 9.7 |
| $B_2O_3$ | 26.0 | 24.2 | 22.7 |
| $Bi_2O_3$ | 7.3 | 13.6 | 19.1 |
| $F^{-1}$ | 2.6 | 2.5 | 2.3 |
| Firing Temperature (°C.) | 576 | 565 | 559 |
| Acid Resistance ASTM C-724-91 | 5 | 5 | 5 |
| Thermal expansion (25–325° C.) | 86 | 83 | 87 |

These results demonstrate the excellent performance characteristics of the glass frits of the present invention, and particularly the low temperature firing characteristics and adequate acid resistance and thermal expansion characteristics.

What is claimed is:

1. A glass substrate having fired thereon a ceramic enamel composition which comprises a lead-free glass frit consisting of the following composition:

| Component | Weight Percent |
| --- | --- |
| ZnO | 25–35 |
| $SiO_2$ | 0–2 |
| $Al_2O_3$ | 0–4 |
| $Na_2O$ | 8–12 |
| $B_2O_3$ | 20–30 |
| $Bi_2O_3$ | 6–25 |
| $F^{-1}$ | 1–5 | and a vehicle therefor.

2. A substrate as defined in claim 1 which is automotive glass.

3. A substrate as defined in claim 1 wherein the lead-free glass frit consists of 33.9 weight percent ZnO, 14.9 weight percent $SiO_2$, 0.9 weight percent $ZrO_2$, 3.3 weight percent $Al_2O_3$, 11.1 weight percent $Na_2O$, 26.0 weight percent $B_2O_3$, 7.3 weight percent $Bi_2O_3$, and 2.6 weight percent $F^{-1}$.

4. A substrate as defined in claim 1 wherein the lead-free glass frit consists of 31.6 weight percent ZnO, 13.9 weight percent $SiO_2$, 0.9 weight percent $ZrO_2$, 3.0 weight percent $Al_2O_3$, 10.3 weight percent $Na_2O$, 24.2 weight percent $B_2O_3$, 13.6 weight percent $Bi_2O_3$, and 2.5 weight percent $F^{-1}$.

5. A substrate as defined in claim 1 wherein the lead-free glass frit consists of 29.6 weight percent ZnO, 13.0 weight percent $SiO_2$, 0.8 weight percent $ZrO_2$, 2.8 weight percent $Al_2O_3$, 9.7 weight percent $Na_2O$, 22.7 weight percent $B_2O_3$, 19.1 weight percent $Bi_2O_3$, and 2.3 weight percent $F^{-1}$.

6. A substrate as defined in claim 1 wherein the ceramic enamel composition further contains a metal oxide pigment.

* * * * *